(12) United States Patent
De Monte et al.

(10) Patent No.: US 8,413,697 B2
(45) Date of Patent: Apr. 9, 2013

(54) PNEUMATIC TIRE HAVING A DUAL LAYER TREAD

(75) Inventors: Patrice De Monte, Arlon (BE); Jerome Marcel Germain Delu, Luxembourg (LU); Michel Jacques Albert Ghislain Meunier, Gouvy (BE); Jerome Joel Daniel Delville, Rehon (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/222,458

(22) Filed: Aug. 31, 2011

(65) Prior Publication Data

US 2013/0048167 A1 Feb. 28, 2013

(51) Int. Cl.
*B60C 11/00* (2006.01)
*B60C 1/00* (2006.01)

(52) U.S. Cl.
USPC .............. 152/209.5; 152/152.1; 152/DIG. 2

(58) Field of Classification Search ............... 152/152.1, 152/209.1, 209.5, DIG. 2; *B60C 11/00*
See application file for complete search history.

(56) References Cited

U.S. PATENT DOCUMENTS

| | | | | |
|---|---|---|---|---|
| 2,186,180 | A * | 1/1940 | Sloman et al. | 152/209.25 |
| 4,478,266 | A | 10/1984 | Pierson et al. | 152/209 R |
| 5,795,415 | A * | 8/1998 | Campana et al. | 152/209.18 |
| 5,800,644 | A * | 9/1998 | Eromaki | 152/210 |
| 5,942,069 | A | 8/1999 | Gerresheim et al. | 156/128.1 |
| 6,415,833 | B1 | 7/2002 | Komatsu | 152/152.1 |
| 6,608,125 | B2 | 8/2003 | Cruse et al. | 524/262 |
| 6,849,754 | B2 | 2/2005 | Deschler et al. | 556/427 |
| 2005/0230020 | A1 * | 10/2005 | Miyake | 152/209.19 |
| 2007/0187013 | A1 * | 8/2007 | Losi et al. | 152/209.5 |
| 2009/0107597 | A1 | 4/2009 | Loewenhaupt et al. | 152/209.5 |

FOREIGN PATENT DOCUMENTS

| | | |
|---|---|---|
| DE | 19812934 | 9/1999 |
| DE | 19850766 | 5/2000 |
| DE | 102007043697 | 3/2009 |
| EP | 0718127 | 6/1996 |
| EP | 0798142 | 10/1997 |
| EP | 0798142 | 3/1998 |

OTHER PUBLICATIONS

European Search Report received by Applicant(s) Nov. 27, 2012.

* cited by examiner

*Primary Examiner* — Justin Fischer
*Assistant Examiner* — Philip N Schwartz
(74) *Attorney, Agent, or Firm* — Robert N. Lipcsik

(57) ABSTRACT

A pneumatic tire comprising a carcass and a tread located radially outward of the carcass and extending between the tire sidewalls is disclosed. The tread provides a tread running surface and comprises a first, radially outer tread layer comprising a first rubber compound and a second, radially inner tread layer comprising a second rubber compound, wherein the second tread layer is located radially adjacent to the first tread layer, and wherein the first rubber compound is different from the second rubber compound. The second tread layer comprises a plurality of integrally formed extensions of the second tread layer extending from the second tread layer radially outwardly to the tread running surface. The first rubber compound and the second rubber compound each comprise at least at least 30 parts per hundred parts of rubber (phr) of silica. Each of the extensions has a width as measured in the axial direction of the tire in a range of from 1 to 15 mm.

6 Claims, 6 Drawing Sheets

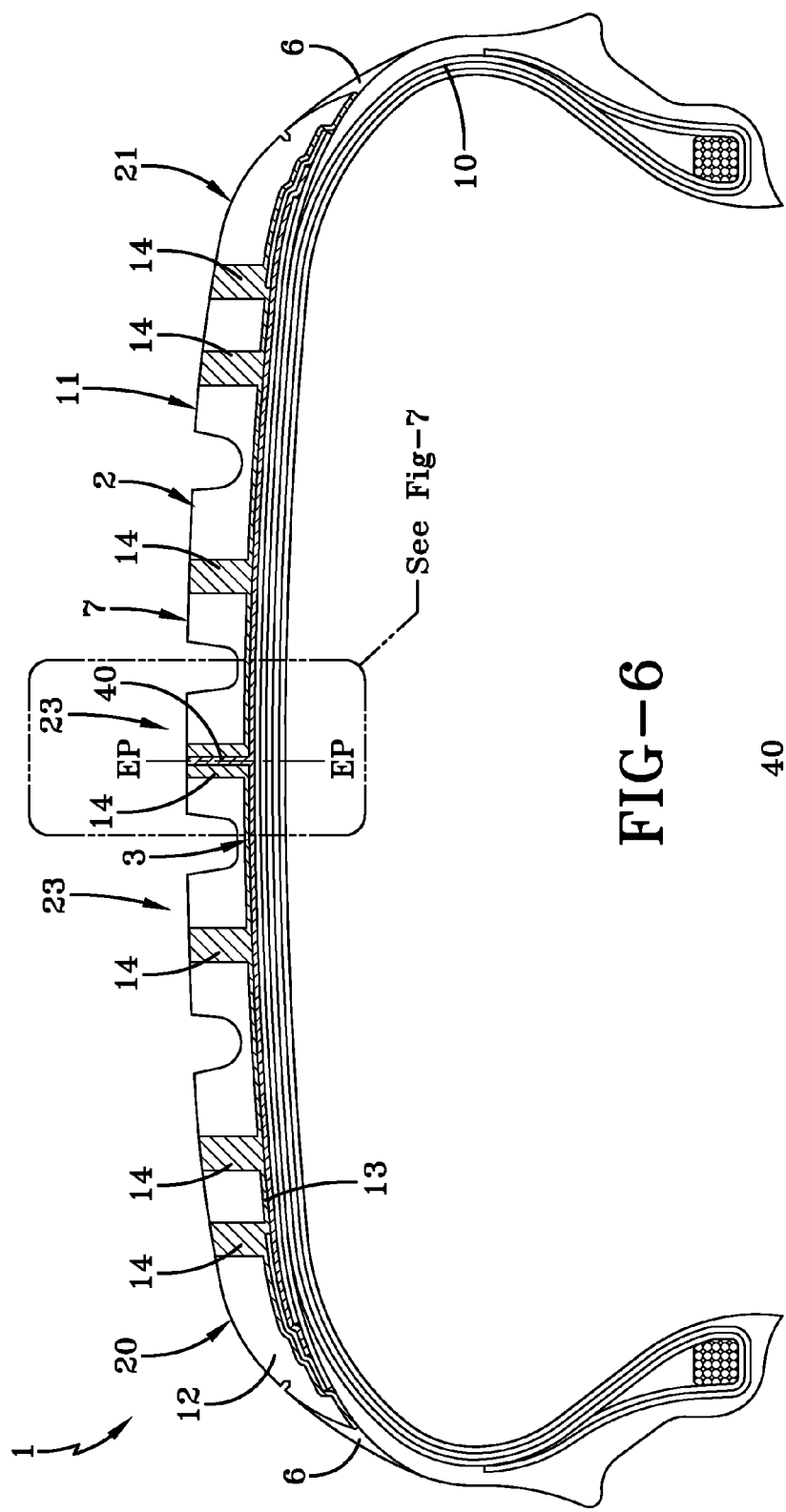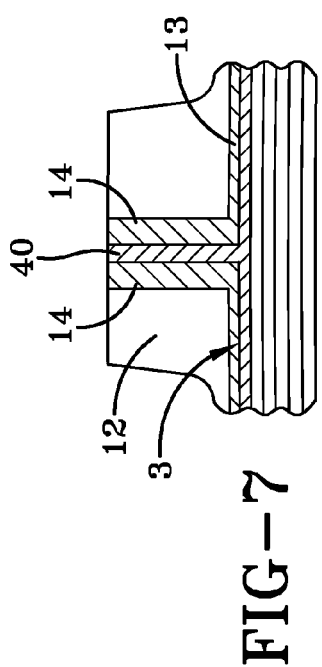
FIG-6
FIG-7

PNEUMATIC TIRE HAVING A DUAL LAYER TREAD

FIELD OF THE INVENTION

The present invention relates to a pneumatic tire and more specifically to a tire having a tread comprising a first tread layer and a second tread layer wherein extensions from the second tread layer extend through the first tread layer to the tread running surface.

BACKGROUND OF THE INVENTION

US-A-2009/0107597 describes a tire with a wear resistant rubber tread having a cap/base construction. At the lateral edges of the tread and adjacent to the tire shoulders, the tread base layer extends to the tread running surface. The tread cap rubber compound and the tread base rubber compound may comprise silica. The axial width of the extensions of the tread base layer at the tread running surface is at least 20 mm. A similar tire construction is also known from DE-C-198 12 934 and EP-B-0 798 142.

U.S. Pat. No. 6,415,833 describes a tire having a tread, the tread comprising one or two strips of an electrically good conducting, silica-free rubber composition extending in radial direction from the tread running surface through the tread. The strips have an axial width in a range of from 0.1 to 1 mm.

U.S. Pat. No. 5,942,069 describes a tire having a tread having a cap/base construction. The base extends in one or more strips from the tread base layer radially outside to the tread running surface. The rubber compound of the tread base layer is an electrically good conducting, silica-free rubber composition.

U.S. Pat. No. 4,478,266 describes a composite tread compound having a radially outer low hysteresis compound and a radially inner high hysteresis compound. Both compounds are free of silica. The inner compound extends in a triangular pattern radially outwards into the outer compound.

SUMMARY OF THE INVENTION

The present invention relates to a pneumatic tire comprising a carcass and a tread located radially outward of the carcass and extending between the tire sidewalls, the tread providing a tread running surface, the tread comprising a first, radially outer tread layer comprising a first rubber compound and a second, radially inner tread layer comprising a second rubber compound, wherein the second tread layer is located radially adjacent to the first tread layer, wherein the first rubber compound is different from the second rubber compound, wherein the second tread layer comprises a plurality of integrally formed extensions of the second tread layer extending from the second tread layer radially outwardly to the tread running surface, wherein the first rubber compound and the second rubber compound each comprise at least 30 parts per hundred parts of rubber (phr) of silica, alternatively at least 40 phr or at least 50 phr of silica, and wherein each of the extensions has a width as measured in the axial direction of the tire in a range of from 1 to 15 mm. The integrally formed extensions of the second tread layer may extend on the tread running surface circumferentially about the complete circumference of the tread running surface.

In an example aspect of the present invention, the width of at least one of the extensions may be in a range from 2 to 10 mm, alternatively in a range from 3 to 7 mm or from 4 to 6 mm. The widths of the plurality of extensions may also vary, i.e., shoulder rib extensions may be wider than central rib extensions or central rib extensions may be wider than shoulder rib extensions in accordance with the respective tire performance needs respectively. It may also be that a shoulder rib extension on one tire side is wider than a shoulder rib extension on the other tire side. A shoulder rib extension on the tire outboard side may be wider than a shoulder rib extension on the tire inboard side.

In another example aspect of the present invention, the tread comprises a first and a second circumferentially extending shoulder rib and at least one circumferentially extending central rib wherein each of the first and the second shoulder rib comprises at least one or at least two of the extension(s). The shoulder rib extensions each may have two or three such extensions. In an alternative embodiment, only the tire outboard side shoulder rib has two or three such extensions and the tire inboard side shoulder rib has no or only one such extension. In yet an alternative embodiment, only the tire inboard side shoulder rib has two or three such extensions and the tire outboard side shoulder rib has no or only one such extension.

In still another example aspect of the present invention, the tread comprises a first and second circumferentially extending shoulder rib and at least one circumferentially extending central rib wherein each of the at least one central rib(s) comprises at least one or exactly one of the extension(s).

In yet another example aspect of the present invention, the tread comprises a first and second circumferentially extending shoulder rib and at least one circumferentially extending central rib, preferably two or three circumferentially extending central ribs, wherein each of the at least one central ribs(s) has one of said extension(s) and each of the shoulder ribs has two or three of said extensions.

In still another example aspect of the present invention, the tread comprises at least one circumferentially extending central rib, preferably two or three circumferentially extending central ribs, wherein at least one or each of the central rib(s) comprises one or two of the extension(s). In one embodiment, the central rib crossed by the equatorial plane or closest to the equatorial plane has two such extensions and the other central ribs have only one or no such extensions. In an alternative embodiment, the central rib crossed by the equatorial plane or closest to the equatorial plane has only one or no such extensions and the other central ribs have two such extensions. In yet another alternative embodiment, the central rib crossed by the equatorial plane or closest to the equatorial plane has no such extensions and the other central ribs have one or two such extensions.

In yet another example aspect of the present invention, the first rubber compound comprises silica, such as precipitated silica, in a range from 30 to 80 phr or from 30 to 120 phr, alternatively from 40 to 60 phr or about 50 phr, and carbon black in a range from 10 to 80 phr or 30 to 80 phr, alternatively from 40 to 60 phr or about 50 phr. In yet another example aspect of the present invention, the second rubber compound comprises silica, such as precipitated silica, in a range from 70 to 130 phr or 50 to 130 phr, alternatively from 85 to 115 phr or about 100 phr, and carbon black in a range from 0 to 60 phr or 0 to 25 phr, alternatively 0 to 10 phr.

In still another example aspect of the present invention, the second rubber compound comprises silica in a range from 30 to 80 phr, alternatively 40 to 60 phr or about 50 phr, and carbon black in a range from 30 to 80 phr, alternatively 40 to 60 phr or about 50 phr; and the first rubber compound comprises silica in a range from 70 to 130 phr, alternatively 85 to 115 phr or about 100 phr, and carbon black in a range from 0 to 5 phr, alternatively 0 to 10 phr.

In yet another example aspect of the present invention, the shore A hardness of the first rubber compound is larger than the shore A hardness of the second rubber compound. In this case, the difference between the shore A hardness value of the first rubber compound and the shore A hardness value of the second rubber compound may be at least 3, alternatively at least 5, at least 10 or at least 20. In another example aspect of the present invention, the first rubber compound has a shore A hardness in a range of from 50 to 70 such as about 57, alternatively from 60 to 70 such as about 65, and the second rubber compound has a shore A hardness in a range from 45 to 60, alternatively from 50 to 60 such as about 55 or about 52.

In still another example aspect of the present invention, the shore A hardness of the second rubber compound is larger than the shore A hardness of the first rubber compound. In this case, the difference between the shore A hardness value of the second rubber compound and the shore A hardness value of the first rubber compound may be at least 3, alternatively at least 5, at least 10 or at least 20. In another example aspect of the present invention, the second rubber compound has a shore A hardness in a range from 50 to 70, alternatively from 60 to 70 phr, and the first rubber compound has a shore A hardness in a range from 45 to 60, alternatively from 50 to 60 phr. The Shore A hardness of a rubber compound may be adjusted to the respective needs, inter alia, by the amount of filler added to the rubber compound, the amount of oil added to the green rubber compound, and the amount of sulfur added to the green rubber compound. This allows it also to adjust the Shore A hardness independently from the wear properties of the respective rubber compound, i.e., a soft rubber compound does not necessarily have a high wear and a hard rubber compound does not necessarily have a low wear.

In yet another example aspect of the present invention, the first, radially outer tread layer has a thickness as measured in the radial direction of the tire from the tread running surface to the radially innermost edge of the radially outer tread layer of at least 5.3 mm for a passenger tire and of at least 12.3 mm for a truck tire.

In still another example aspect of the present invention, the thickness of the first, radially outer tread layer is in a range from 5.3 to 7.0 mm for a passenger tire and in a range from 12.3 to 14.0 mm for a truck tire.

In yet another example aspect of the present invention, thickness of the radially outer tread layer is such that it is about (+/−1 mm) the depth of the deepest groove in the tread pattern. Thickness of the radially outer tread layer may be slightly larger, for example 0.3 to 1.0 mm larger, than the depth of the deepest groove in the tread pattern.

In yet another example aspect of the present invention, the radially inner tread layer has a thickness as measured in the radial direction of the tire from the radially outermost edge of the radially inner tread layer to the radially innermost edge of the radially inner tread layer and axially adjacent the extension(s) in a range from 0.3 to 2.0 mm, alternatively in a range from 0.3 to 1.0 mm or about 0.5 mm.

In still another example aspect of the present invention, the tread further comprises a tread base layer comprising a third rubber compound, wherein the tread base layer is located radially adjacent to the second tread layer under the second tread layer, wherein the third rubber compound is different from the second rubber compound and also different from the first rubber compound, and wherein the tread base layer axially extends from the one tire shoulder to the opposite tire shoulder. In this case, the first tread layer may also be termed a radially outer tread cap layer and the second tread layer may be termed a radially inner tread cap layer with the tread base layer radially adjacent and below the radially inner tread cap layer. In an alternative embodiment, the tread base layer may also be the second, radially inner tread layer so that no further base layer is present. In this case, the first radially outer tread layer may also be termed a tread cap layer and the second, radially inner tread layer may be termed a tread base layer.

In yet another example aspect of the present invention, the tread base layer comprises at least one integrally formed base extension of the tread base layer extending from the tread base layer radially outwardly to the tread running surface. The base extension(s) may extend on the tread running surface circumferentially about the complete circumference of the tread running surface. The base extension may extend radially within one of the integrally formed extensions of the second tread layer. The base extension may extend within one of the integrally formed extensions of the second tread layer to the tread surface. In another example aspect of the present invention, the base extension may extend laterally adjacent or laterally distant from the integrally formed extensions of the second tread layer through the second tread layer and through the first tread layer to the tread surface.

In still another example aspect of the present invention, the first tread layer and the second tread layer are electrically insulating or poorly conducting, i.e., a specific resistance of more than $10^8$ $\Omega$cm, with regard to a discharge of static electric charges from the tire when operated on a vehicle. The specific resistance may even be more than $10^9$ $\Omega$cm or $10^{10}$ $\Omega$cm.

In yet another example aspect of the present invention, the tread base layer is electrically conducting, i.e., a specific resistance of less than $10^7$ $\Omega$cm, with regard to a discharge of static electric charges from the tire when operated on a vehicle. The specific resistance may even be less than $10^6$ $\Omega$cm.

In still another example aspect of the present invention, the third rubber compound comprises less than 15 phr silica or no silica and more than 40 phr carbon black, alternatively more than 60 phr carbon black.

In still another example aspect of the present invention, the first tread layer is electrically insulating or poorly conducting and the second tread layer is electrically conducting with regard to a discharge of static electric charges from the tire when operated on a vehicle.

In still another example aspect of the present invention, the first tread layer is electrically conducting and the second tread layer is electrically insulating or poorly conducting with regard to a discharge of static electric charges from the tire when operated on a vehicle.

In yet another example aspect of the present invention, the tread base layer has a thickness as measured in the radial direction of the tire from the radially outermost edge of the tread base layer to the radially innermost edge of the tread base layer and axially adjacent the extension(s) in a range from 0.3 to 2.0 mm, alternatively in a range from 0.3 to 1.0 mm or about 0.5 mm.

In still another example aspect of the present invention, the base extension has a width as measured in the axial direction of the tire in a range from 0.5 to 2.0 mm, alternatively 0.6 to 1.0 mm.

In yet another example aspect of the present invention, the first tread layer comprises particles or fibers or a combination thereof selected from the group consisting of sand particles, glass particles, thermoplastic particles, such as UHMWPE (ultra high molecular weight polyethylene), aramid fibers, Kevlar fibers, and hard ceramic particles. The first tread layer may comprise 3 phr to 60 phr, alternatively 3 phr to 40 phr or 10 phr to 30 phr, of said particles or fibers or the combination thereof.

In still another example aspect of the present invention, the second tread layer comprises particles or fibers or a combination thereof selected from the group consisting of sand particles, glass particles, thermoplastic particles, such as UHMWPE, aramid fibers, Kevlar fibers, and hard ceramic particles. The second tread layer may comprise 3 phr to 60 phr, alternatively 3 phr to 40 phr or 10 phr to 30 phr, of said particles or fibers or the combination thereof. In this embodiment, the first tread layer may then be free of said particles or fibers.

In another example aspect of the present invention, the wear of the first compound, when used as the sole tread compound on a tire, is not more than 20% different, alternatively not more than 10% different, from the wear of the second compound when used as the sole tread compound on the tire to avoid or reduce uneven wear of the tire.

In still another example aspect of the present invention, the tread pattern of the tire is asymmetric with regard to the equatorial plane (CP) of the tire.

In yet another example aspect of the present invention, the arrangement of the extensions of the second tread layer is asymmetric with regard to the equatorial plane (CP) of the tire.

In still another example aspect of the present invention, the axial widths of at least two of the extensions of the second tread layer are different.

In yet another example aspect of the present invention, the one or more extension(s) having the largest axial width is/are the axially outermost extension(s).

In still another example aspect of the present invention, the one or more extension(s) (14) having the largest axial width is/are the axially innermost extension(s).

BRIEF DESCRIPTION OF THE DRAWINGS

For a further understanding of the present invention, drawings are provided.

FIG. 6 is a tread of a tire in accordance with an alternative embodiment of the present invention.

FIG. 7 shows a detail of FIG. 6.

DETAILED DESCRIPTION OF AN EXAMPLE OF THE PRESENT INVENTION

Figure 1:
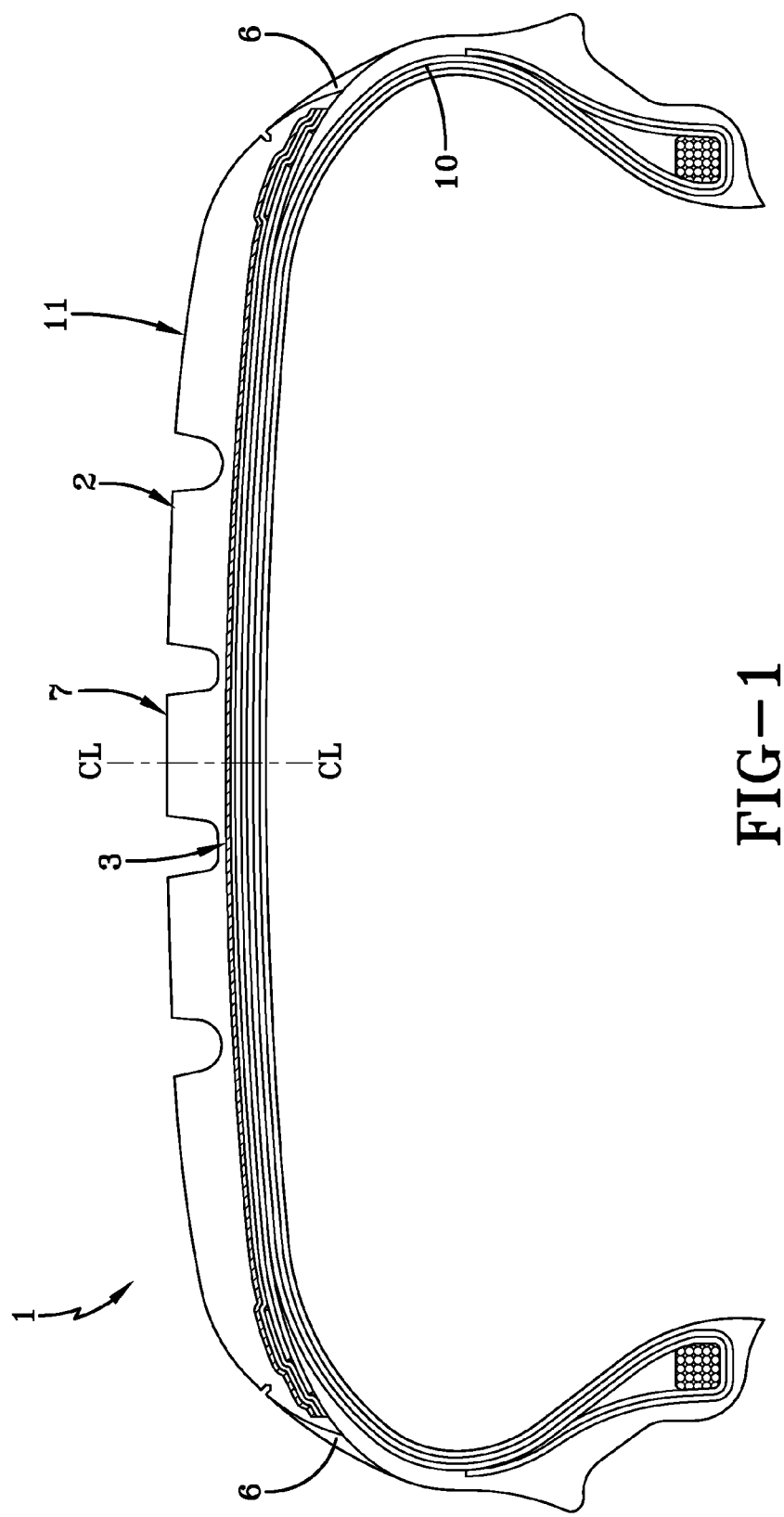
FIG. 1 is a partial cross-sectional view of an example tire having a tread of a cap/base construction in accordance with one embodiment of the present invention.
Figure 2:
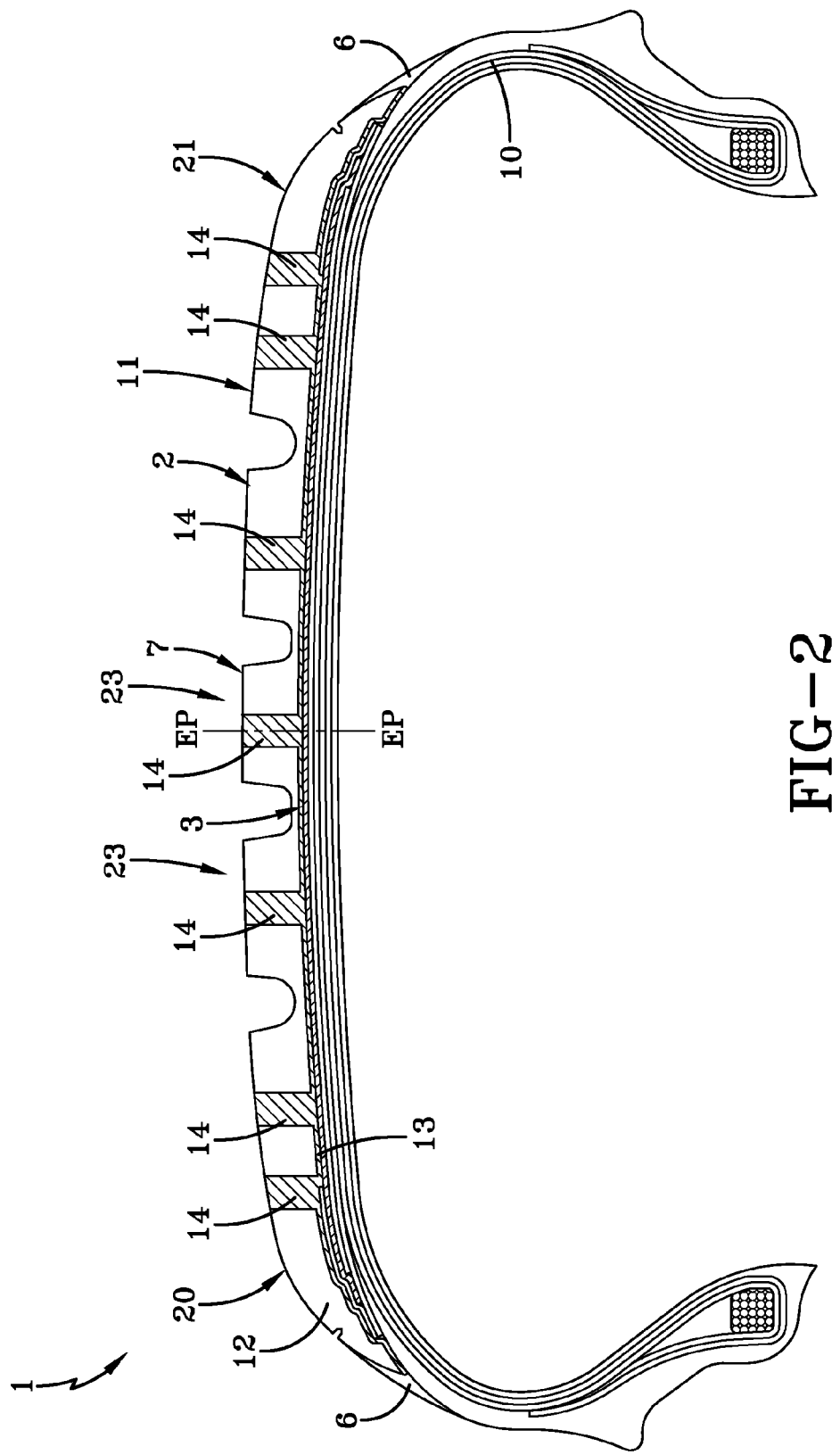
FIG. 2 shows a cross-sectional view the tread of the tire of FIG. 1 in more detail.
Figure 4:
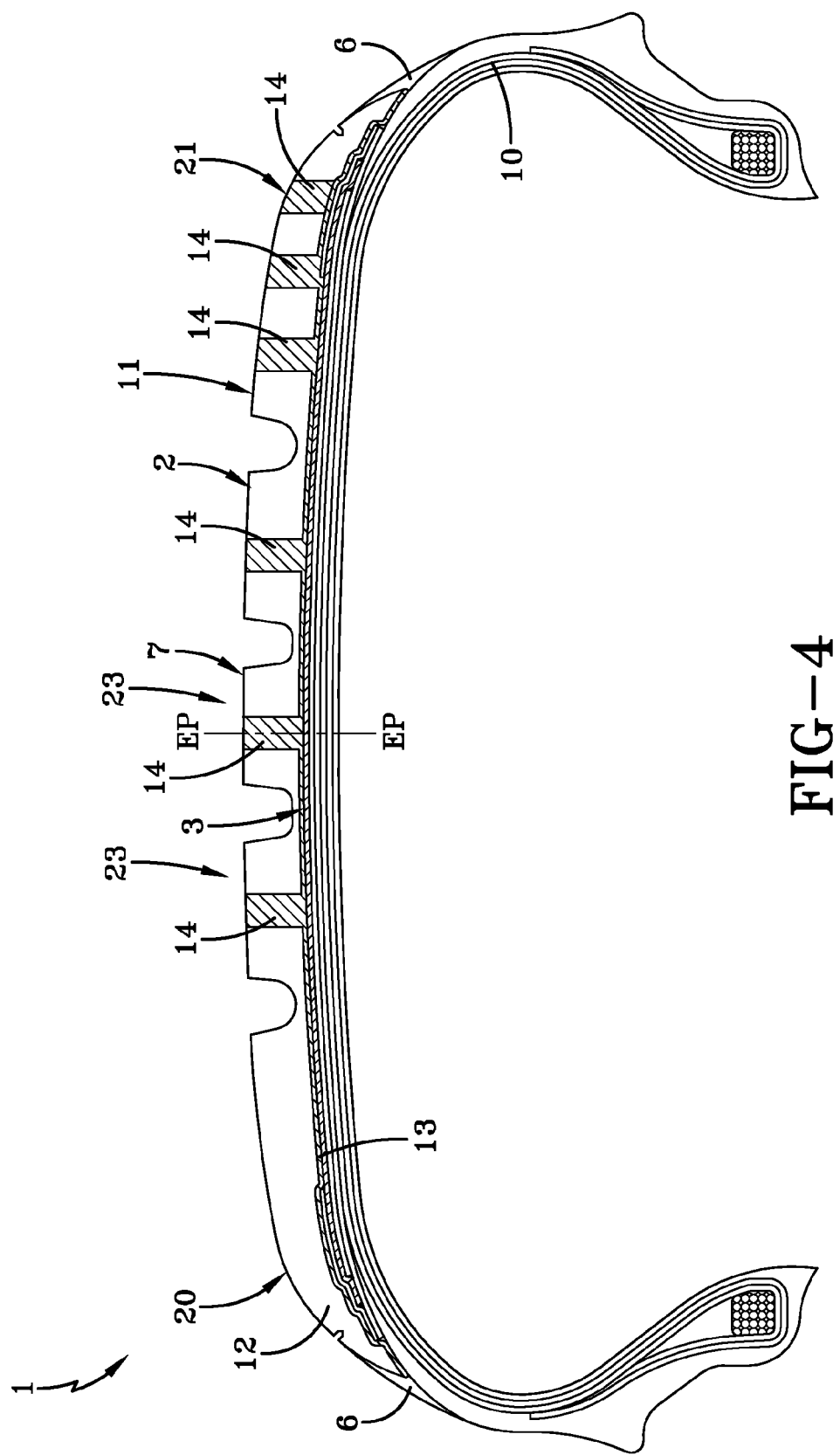
FIG. 4 is a tread of a tire in accordance with an alternative embodiment of the present invention.
Figure 5:
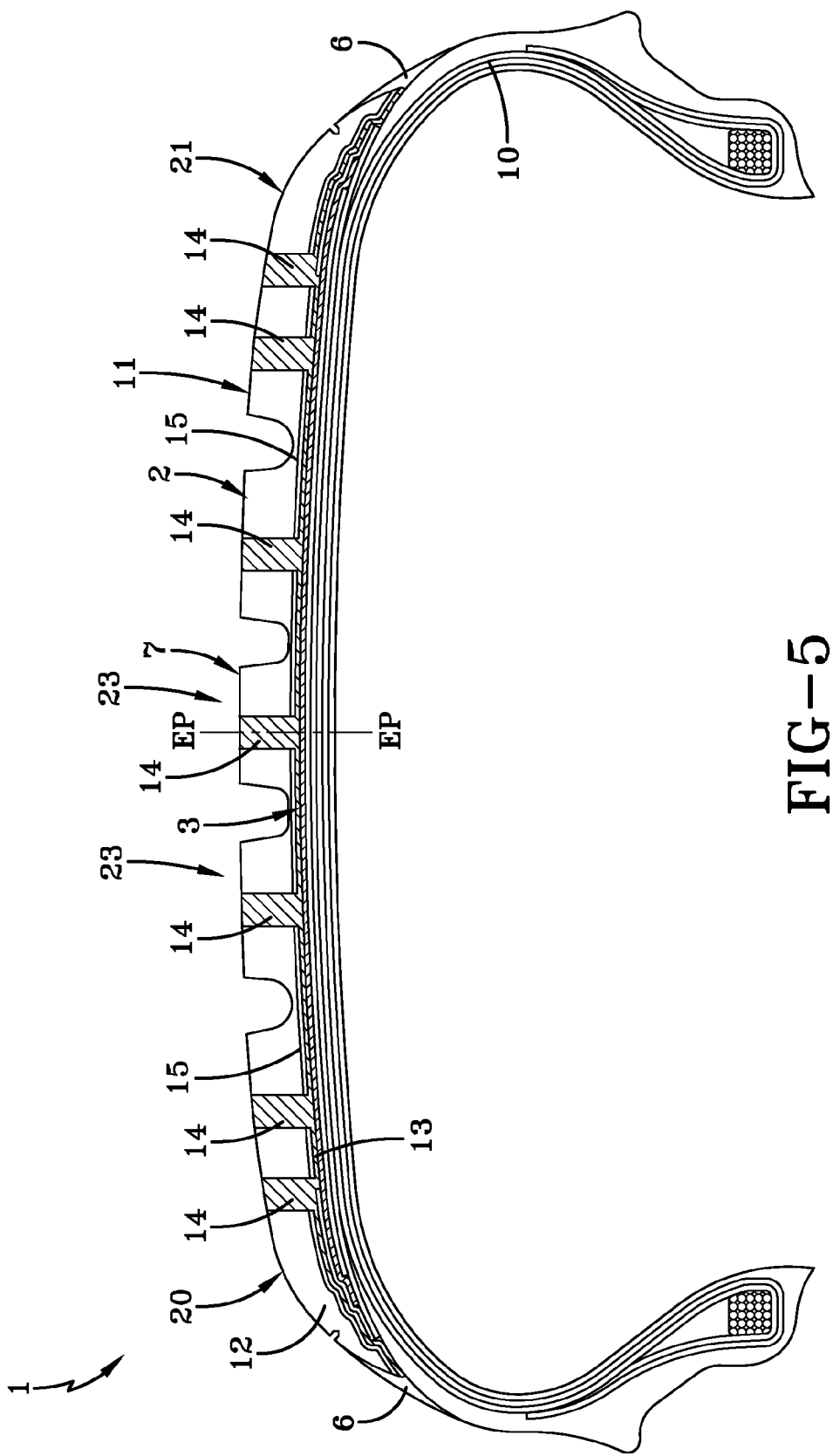
FIG. 5 is a tread of a tire in accordance with an alternative embodiment of the present invention.

FIG. 1 depicts a tire 1 having a carcass 10 and a tread 11 comprising a tread cap layer 2 or a first tread layer 12 of a lug and groove configuration. Radially below the first tread layer 12 is a tread base layer 3 or a second tread layer 13. Accordingly, the tread 11 may have only two layers, namely the first tread layer 12 as the tread cap layer and the second tread layer 13 as the tread base layer as shown in FIGS. 1-4, it may however also have three or more than three layers, namely the first tread layer 12 which then may also be called the radially outer tread cap layer, the second tread layer 13 which then may also be called the radially inner tread cap layer, and the tread base layer underlying the second tread layer 13 as shown in FIGS. 5-7.

The tread 11 has a tread running surface 7 which is ground contacting when the tire 1 is operated on a vehicle. The tread comprises a first, circumferentially extending shoulder rib 20 and a second, circumferentially extending shoulder rib 21 which is located on the outboard side 50 of the tire 1 when the tire is mounted on a vehicle in accordance with its specification. Between the shoulder ribs 20, 21, there is one or more circumferentially extending central rib(s) 23. In the embodiment shown in FIG. 1, there are three such central ribs 23. The tire 1 may be a symmetric tire with regard to its equatorial plane CP as shown in FIGS. 1, 2, 3, 5, 6 and 7. The tire may alternatively also be an asymmetric tire as shown in FIG. 4. Laterally outside of the shoulder ribs 20, 21, the tire 1 may comprise tread wings 6 in the tire shoulders.

FIG. 1 further shows that the second tread layer 13 comprises a plurality of integrally formed extensions 14 of the second tread layer 13 extending from the second tread layer 13 radially outward to the tread running surface 7. These extensions 14 are unitary with the second tread layer 13 and hence of the same rubber compound as the second tread layer 13. FIG. 1 shows that the central ribs 23 each have one such extension 14 and that the shoulder ribs each have two such extensions. The axial width of these extensions may be in a range of from 5 to 10 mm.

Figure 3:
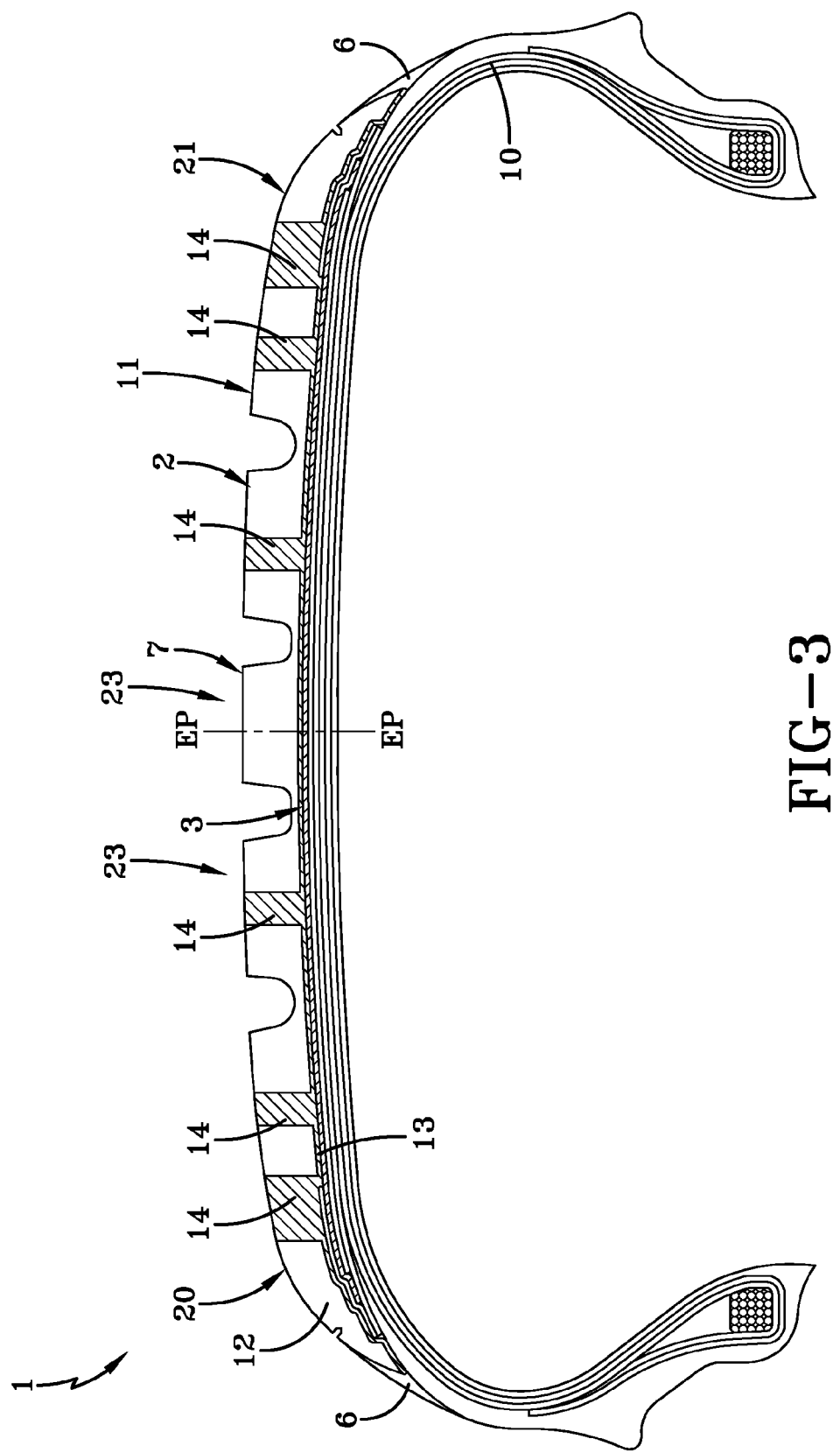
FIG. 3 is a tread of a tire in accordance with an alternative embodiment of the present invention.

FIG. 3 shows an alternative embodiment with a different arrangement of the extensions 14. In this embodiment, the extensions 14 in the shoulder ribs 20, 21 may be wider than the extensions 14 in the central ribs 23. The extensions 14 in the shoulder ribs 20, 21 in FIG. 3 may have an axial width of 7 to 15 mm, or 10 to 15 mm, whereas the width of the extensions 14 in the central ribs 23 may be in a range from 4 to 10 mm, or 5 to 8 mm. As shown in FIG. 3, some of the central ribs 14 may not have an extension 14. In fact, the arrangement, width and number of the extensions 14 may be variable to a large extent and may allow it to adapt the tire performance (wet braking, grip on snow or ice, handling, dry braking, etc.) in accordance with the respective needs.

FIG. 4 shows a further embodiment of the present invention with three extensions 14 in the second shoulder rib 21 on the outboard side 50 of the tire 1 and two extensions 14 in the first shoulder rib 20 on the inboard side. This allows it to adjust the cornering stiffness and handling of the tire in accordance with the respective needs.

FIG. 5 shows an embodiment of the present invention wherein the tread 11 has a tread cap comprising two layers, namely the first tread layer 12 and the second layer 13. The extensions 14 extend from the second tread layer 13 to the tread running surface. Underlying the second tread layer 13, there is a further tread base layer 3.

FIG. 6 shows a modification of the embodiment of FIG. 5 wherein the tread base layer 3 comprises a radially extending base extension 40 which is unitary with the tread base layer 3 and hence of the same rubber compound as the tread base layer 3 and which extends through the second tread layer 13 and through the first tread layer 12 to the tread running surface 7. The base extension 40 may be located within an extension 14 as shown in FIG. 6 and FIG. 7 or may be located laterally adjacent to an extension either distant from an extension 14 or proximate an extension 14.

As shown in FIGS. 1-6, the first tread layer 12 may constitute 50 to 90 percent, or 60 to 85 percent, of the tread running surface 7, and the individual extensions 14 together may constitute 10 to 50 percent, or 15 to 40 percent, of the tread surface 7.

The rubber compounds used to manufacture the first tread layer 12 and the second tread layer 13 may be conventional tread cap rubber compounds. These compounds may be adjusted to have the required filler content and, optionally, the required Shore A hardness and/or wear properties.

In one embodiment, the rubber compound of the first tread layer 12 is a conventional rubber compound which is optimized for grip on snow and ice, whereas the rubber compound of the second tread layer 13 is a conventional rubber compound which is optimized for grip on wet roads. In another embodiment, the rubber compound of the first tread layer 12 is a conventional rubber compound which is optimized for grip on wet roads whereas the rubber compound of the second tread layer 13 is optimized for grip on wet roads. Accordingly, in one embodiment, the rubber compounds for the first and second tread layer 12, 13 may be conventional tread cap compounds for winter tires. In another embodiment, the rubber compound for the first tread layer 12 may be a conventional tread cap compound for a summer tire and the rubber compound for the second tread layer 13 may be a conventional tread cap compound for a winter tire. In yet another embodiment, the rubber compound for the first tread layer 12 may be a conventional tread cap compound for a winter tire and the rubber compound for the second tread layer 13 may be a conventional tread cap compound for a summer tire.

The rubber compounds of the first tread layer 12, the second tread layer 13 and the tread base layer 3 may be made with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of the present invention, the terms "rubber" and "elastomer" may be used interchangeably, unless otherwise prescribed. The terms "rubber composition", "compounded rubber" and "rubber compound" may be used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives; for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

The rubber may comprise at least two of diene based rubbers. For example, a combination of two or more rubbers may be cis 1,4-polyisoprene rubber (natural or synthetic), 3,4-polyisoprene rubber, styrene/isoprene/butadiene rubber, emulsion and solution polymerization derived styrene/butadiene rubbers, or cis 1,4-polybutadiene rubbers and emulsion polymerization prepared butadiene/acrylonitrile copolymers.

An emulsion polymerization derived styrene/butadiene (E-SBR) may have a relatively conventional styrene content of 20 to 28 percent bound styrene or, for some applications, an E-SBR having a medium to relatively high bound styrene content, namely, a bound styrene content of 28 to 45 percent.

Emulsion polymerization prepared (E-SBR) may be styrene and 1,3-butadiene copolymerized as an aqueous emulsion. The bound styrene content may vary, for example, from 5 to 50 percent. The E-SBR may also contain acrylonitrile to form a terpolymer rubber, as E-SBAR, in amounts, for example, of 2 to 30 weight percent bound acrylonitrile in the terpolymer.

Emulsion polymerization prepared styrene/butadiene/acrylonitrile copolymer rubbers containing 2 to 40 weight percent bound acrylonitrile in the copolymer may also be diene based rubbers for use in the present invention. The solution polymerization prepared SBR (S-SBR) may have a bound styrene content in a range of 5 to 50, or 9 to 36, percent. The S-SBR may be prepared, for example, by organo lithium catalyzation in the presence of an organic hydrocarbon solvent.

Cis 1,4-polybutadiene rubber (BR) may be prepared, for example, by organic solution polymerization of 1,3-butadiene. The BR may be characterized, for example, as having at least a 90 percent cis 1,4-content. The term "phr" as used herein, and according to conventional practice, refers to "parts by weight of a respective material per 100 parts by weight of rubber, or elastomer".

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers and process oil added during compounding. Suitable process oils may include various oils including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 Parts, 2003, 62nd edition, published by the Institute of Petroleum, United Kingdom.

The siliceous pigments used in the rubber compound may include conventional pyrogenic and precipitated siliceous pigments (silica). Precipitated silica may be used. The siliceous pigments employed in the present invention are precipitated silicas such as, for example, those obtained by the acidification of a soluble silicate, e.g., sodium silicate.

Silicas commercially available from PPG Industries under the Hi-Sil trademark with designations 210 and 243, silicas available from Rhodia, with, for example, designations of Z1165MP and Z165GR and silicas available from Degussa AG with, for example, designations VN2 and VN3 may be used.

Carbon blacks may be used as a filler. Representative examples of such carbon blacks may include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including particulate fillers such as ultra high molecular weight polyethylene (UHMWPE), crosslinked particulate polymer gels and plasticized starch composite filler.

In one embodiment, the rubber composition may contain a conventional sulfur containing organosilicon compound. Examples of suitable sulfur containing organosilicon compounds are of the formula:

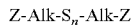

in which Z is selected from the group consisting of

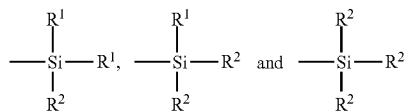

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

The sulfur containing organosilicon compounds may be the 3,3'-bis(trimethoxy or triethoxy silylpropyl)polysulfides. The sulfur containing organosilicon compounds may be 3,3'-bis(triethoxysilylpropyl)disulfide and/or 3,3'-bis(triethoxysilylpropyl)tetrasulfide. Therefore, as to the above formula, Z may be

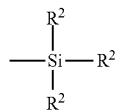

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

Suitable sulfur containing organosilicon compounds include compounds are disclosed in U.S. Pat. No. 6,608,125. The sulfur containing organosilicon compounds may include 3-(octanoylthio)-1-propyltriethoxysilane, $CH_3(CH_2)_6C(=O)-S-CH_2CH_2CH_2Si(OCH_2CH_3)_3$, which may be available commercially as NXT™ from Momentive Performance Materials.

Suitable sulfur containing organosilicon compounds are disclosed in U.S. Pat. No. 6,849,754. The sulfur containing organosilicon compound may be Si-363 from Degussa.

The amount of the sulfur containing organosilicon compound in a rubber composition may vary depending on the level of other additives used. The amount of the compound may range from 0.5 to 20.0 phr. The amount may range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent may be elemental sulfur. The sulfur-vulcanizing agent may be used in an amount ranging from 0.5 to 8 phr, alternatively with a range of from 1.5 to 6 phr. Typical amounts of tackifier resins, if used, comprise 0.5 to 10 phr, usually 1 to 5 phr. Typical amounts of processing aids comprise 1 to 50 phr. Typical amounts of antioxidants comprise 1 to 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise 1 to 5 phr. Typical amounts of fatty acids, if used, which may include stearic acid comprise 0.5 to 3 phr. Typical amounts of zinc oxide comprise 2 to 5 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

Accelerators may be used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 to 4.0, alternatively 0.8 to 1.5, phr. In another embodiment, combinations of a primary and a secondary accelerator may be used with the secondary accelerator being used in smaller amounts, such as from 0.05 to 3.00 phr, in order to activate and to improve the properties of the vulcanizate. In addition, delayed action accelerators may be used which are not affected by normal processing temperatures but produce a satisfactory cure at ordinary vulcanization temperatures. Vulcanization retarders may also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition may be accomplished by methods known to those having skill in the rubber mixing art. For example, the ingredients may be mixed in at least two stages, namely, at least one non-productive stage followed by a productive mix stage. The final curatives including sulfur-vulcanizing agents are typically mixed in the final stage which is called the "productive" mix stage in which the mixing occurs at a temperature, or ultimate temperature, lower than the mix temperature(s) of the preceding non-productive mix stage(s). The rubber composition may be subjected to a thermomechanical mixing step. The thermomechanical mixing step generally comprises mechanical working in a mixer or extruder for a period of time suitable to produce a rubber temperature between 140° C. and 190° C.

The appropriate duration of the thermomechanical working may vary as a function of the operating conditions, and the volume and nature of the components. For example, the duration of thermomechanical working may be from 1 to 20 minutes.

The pneumatic tire of the present invention may be a race tire, passenger tire, aircraft tire, agricultural, earthmover, off-the-road or truck tire. The tire may be a radial or bias tire.

Vulcanization of the pneumatic tire of the present invention may be carried out at conventional temperatures ranging from 100° C. to 200° C. Any of the usual vulcanization processes may be used such as heating in a press or mold, heating with superheated steam or hot air. Such tires may be built, shaped, molded and cured by various methods such as the method described in U.S. Pat. No. 5,942,069.

The vulcanization may be conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. The sulfur vulcanizing agent may be elemental sulfur. Sulfur vulcanizing agents may be used in an amount ranging from 0.5 to 4.0 phr, or even up to 8.0 phr, with a range from 1.5 to 2.5 phr.

What is claimed:

1. A pneumatic tire comprising a carcass and a tread located radially outward of the carcass and extending between the tire sidewalls, the tread providing a tread running surface, the tread comprising a first, radially outer tread layer comprising a first rubber compound and a second, radially inner tread layer comprising a second rubber compound, wherein the second tread layer is located radially adjacent to the first tread layer, wherein the first rubber compound is different from the second rubber compound, wherein the second tread layer comprises a plurality of integrally formed extensions of the second tread layer extending from the second tread layer radially outwardly to the tread running surface, wherein the first rubber compound and the second rubber compound each comprise at least 30 parts per hundred parts of rubber of silica (phr), and wherein each of the extensions has a width as measured in the axial direction of the tire in a range of from 1 to 15 mm, wherein the tread further comprises a tread base layer comprising a third rubber compound, wherein the tread base layer is located radially adjacent to the second tread layer under the second tread layer, wherein the third rubber compound is different from the second rubber compound, and wherein the tread base layer axially extends from the one tire shoulder to the opposite tire shoulder, wherein the tread base layer comprises at least one integrally formed base extension of the tread base layer extending from the tread base layer radially outwardly to the tread running surface, the base extension extending radially within one of the integrally formed extensions of the second tread layer, or the base extension extending laterally adjacent or laterally distant from the integrally formed extensions of the second tread layer through the second tread layer and through the first tread layer to the tread running surface.

2. The tire of claim 1 wherein the width of each of the extensions is in a range of from 1 to 10 mm.

3. The tire of claim 1 wherein the shore A hardness of the first rubber compound is larger than the shore A hardness of the second rubber compound and wherein the difference between the shore A hardness value of the first rubber compound and the shore A hardness value of the second rubber compound is at least 20.

4. The tire of claim 1 wherein the shore A hardness of the first rubber compound is larger than the shore A hardness of the second rubber compound and wherein the first rubber compound has a shore A hardness in a range of from 50 to 70 and the second rubber compound has a shore A hardness in a range from 45 to 60.

5. The tire of claim 1 wherein the radially outer tread layer has a thickness as measured in the radial direction of the tire from the tread running surface to the radially innermost edge of the radially outer tread layer from 5.3 mm to 7 mm.

6. The tire of claim 1 wherein the radially inner tread layer has a thickness as measured in the radial direction of the tire from the radially outermost edge of the radially inner tread layer to the radially innermost edge of the radially inner tread layer and axially adjacent the extension(s) in a range from 0.3 to 2 mm.

* * * * *